(12) United States Patent
Wyler

(10) Patent No.: US 7,661,371 B2
(45) Date of Patent: Feb. 16, 2010

(54) MANWAY SEALING SYSTEM

(75) Inventor: Norman Chris Wyler, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 558 days.

(21) Appl. No.: 11/392,401

(22) Filed: Mar. 29, 2006

(65) Prior Publication Data

US 2007/0235463 A1 Oct. 11, 2007

(51) Int. Cl.
*B61D 39/00* (2006.01)

(52) U.S. Cl. .................................. 105/377.07; 220/835

(58) Field of Classification Search ............ 105/377.07; 220/835; 137/437; 411/44, 265, 268, 253, 411/270
See application file for complete search history.

(56) References Cited

U.S. PATENT DOCUMENTS

| | | | | | |
|---|---|---|---|---|---|
| 938,793 | A | * | 11/1909 | Schraudenbach | 292/301 |
| 1,742,722 | A | * | 1/1930 | Olsson et al. | 411/222 |
| 2,166,730 | A | * | 7/1939 | Schanck | 137/382 |
| 3,209,675 | A | * | 10/1965 | Stimpson et al. | 99/473 |
| 3,314,444 | A | * | 4/1967 | White, Jr. | 137/377 |
| 3,508,774 | A | * | 4/1970 | Simonson | 411/265 |
| 3,786,955 | A | * | 1/1974 | Mowatt-Larssen | 220/327 |
| 3,887,990 | A | * | 6/1975 | Wilson | 29/450 |
| 5,158,022 | A | * | 10/1992 | Dugge et al. | 105/377.07 |
| 5,644,990 | A | * | 7/1997 | Seitz | 105/377.07 |
| 5,690,141 | A | * | 11/1997 | Creaghe | 137/382 |
| 5,762,088 | A | * | 6/1998 | Crochet et al. | 137/15.01 |
| 6,095,365 | A | * | 8/2000 | Yielding | 220/264 |
| 6,244,806 | B1 | * | 6/2001 | Kato | 411/265 |
| 6,390,119 | B1 | * | 5/2002 | Crochet et al. | 137/347 |
| 2005/0205576 | A1 | * | 9/2005 | Bednara et al. | 220/328 |
| 2007/0110541 | A1 | * | 5/2007 | Rawlins et al. | 411/54.1 |
| 2007/0235463 | A1 | * | 10/2007 | Wyler | 220/835 |

* cited by examiner

*Primary Examiner*—S. Joseph Morano
*Assistant Examiner*—Jason C Smith
(74) *Attorney, Agent, or Firm*—Tammye L. Taylor; Bernard J. Graves, Jr.

(57) ABSTRACT

An improved safety collar (10) for a manway system (24) provides a tapered component for guiding the collar into an aperture of a manway lid (28), thus preventing the collar from snagging an edge of the aperture and holding the lid in an open position. The safety collar is defined by an annular wall with a smooth outer surface (12) and a threaded inner surface (14). A chamfered rim (16) of the collar presents an annular sloping surface (18) generally sloping inwardly and upwardly from the outer surface to the inner surface. When the collar is threaded onto a bolt (66) of the bolt assembly, the chamfered rim (16) of the collar guides the collar into an aperture (58) of the manway lid, such as when the lid is lowered into position against a base (26) of the manway system.

24 Claims, 5 Drawing Sheets

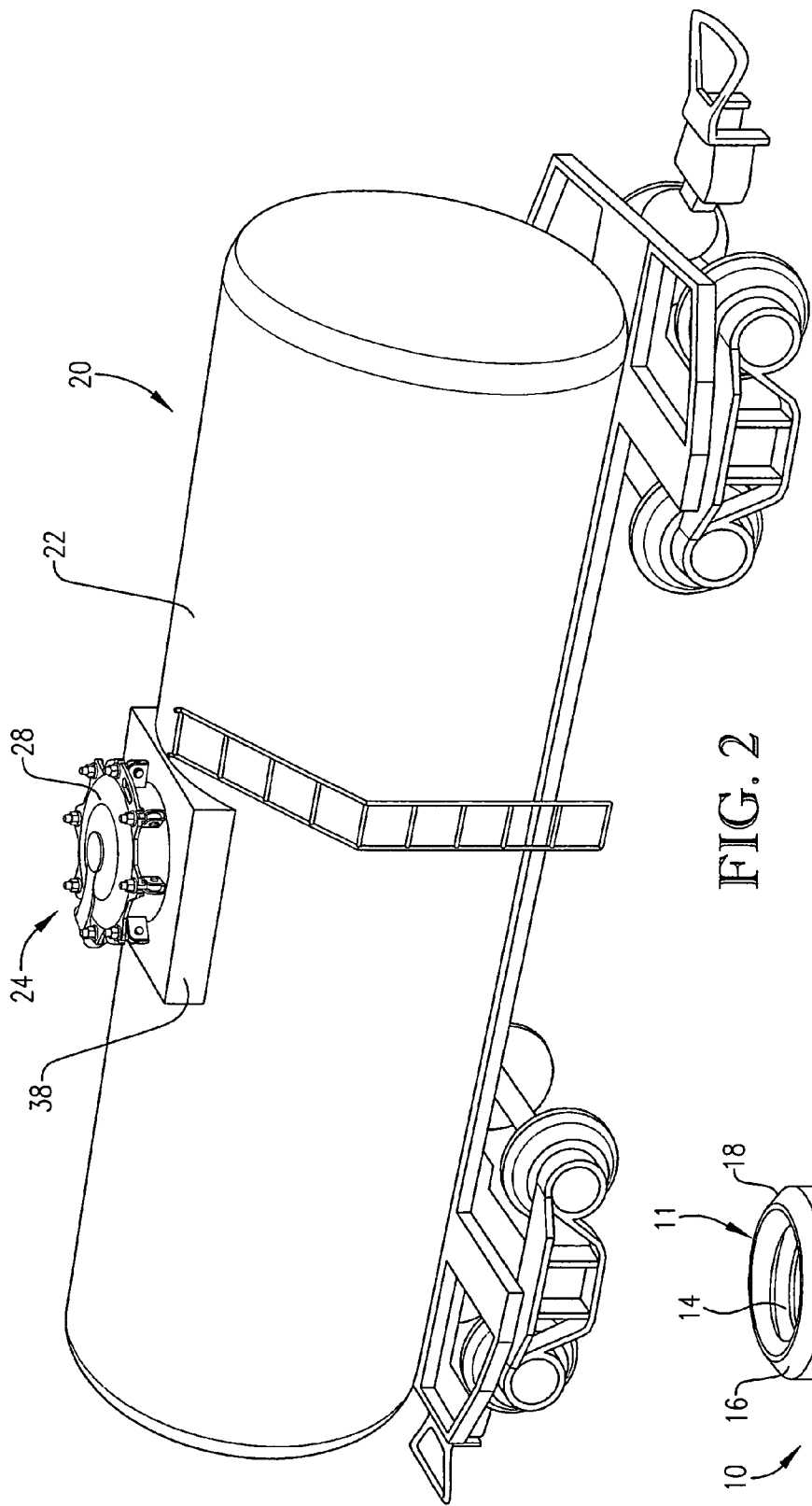
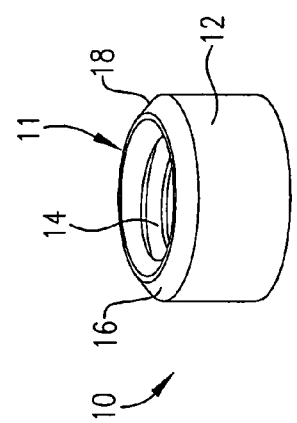
FIG. 2
FIG. 1

MANWAY SEALING SYSTEM

BACKGROUND OF THE INVENTION

1. Field of the Invention

The present invention relates to the field of manway systems for railroad tank cars and similar containers. Particularly, the invention relates to a manway sealing system with an improved safety collar that facilitates sealing a manway lid against a manway base, thereby reducing the risk of leaks.

2. Description of the Prior Art

Railway tank cars and similar containers for transporting liquids in bulk include manways, or passages through which people or contents may pass into or out of the container. A typical manway includes a flat, disc-shaped lid and a circular base, wherein the lid is pivoted up and away from the base to open the manway and is pivoted down and against the base to close and seal the manway.

The lid is secured to the base via a plurality of eye bolts that are pivotally attached to the base at various points around a perimeter of the base. The lid includes a flat, radially-extending flange corresponding to each bolt, wherein each flange presents an aperture for receiving a bolt. Each aperture includes an outer, narrow aperture neck leading to a broader aperture seat. The bolts are pivoted into the aperture seat through the neck, a washer is placed over the end of the bolt, and a nut is threaded onto the bolt and tightened against the washer to secure the bolt in place.

To prevent inadvertent movement of the bolt out of the aperture seat, a user threads a safety collar onto the bolt so that the safety collar rests below the washer and within the aperture seat. The safety collar is small enough to fit within the aperture seat but is larger in diameter than the aperture neck, thus preventing the bolt from pivoting out of the aperture seat. To open the manway lid, the user loosens the nut until the flange of the lid can be raised above the collar. With the flange above the collar, the bolt can be pivoted out of the aperture and away from the lid.

Unfortunately, the safety collar suffers from various limitations. Because the safety collar is only slightly smaller in diameter than the aperture seat, for example, the flange may snag the collar when the lid is pivoted from the open position to the closed position and rest on the collar instead of the manway base. When this happens, the collar holds the lid slightly above the base and prevents a seal from forming between the lid and the base. Because the lid is held only slightly above the manway base in these situations, it may go unnoticed and left unsealed during transport, thus allowing contents to spill when the container is moved.

Accordingly, there is a need for an improved manway sealing system that ensures a tight seal between the lid and the base.

SUMMARY OF THE INVENTION

The present invention solves the above-described problems and provides a distinct advance in the art of manway sealing systems. More particularly, the present invention involves a manway system that includes a plurality of bolts securing a lid of the system to a base of the system, wherein at least one of the bolts includes a safety collar with a chamfered rim. The collar prevents the bolt from inadvertently swinging out of the aperture seat and the chamfered rim guides the aperture seat into position as the lid is closed onto the manway base.

According to a first embodiment of the invention, the manway sealing system includes a base and a lid for engaging the base. The lid includes an aperture with an aperture seat and an aperture neck, wherein the neck is narrower than the seat. A bolt is pivotally secured to the base such that the bolt is moveable from a locked position to an unlocked position, wherein a portion of the bolt passes through the aperture neck into the aperture seat when the bolt is moved from the unlocked position to the locked position.

A collar is attached to the bolt such that the collar is seatable within the aperture seat when the bolt is in the locked position, wherein an outer surface of the collar fits within the aperture seat and presents a width greater than a width of the aperture neck, thereby preventing the collar from passing through the aperture neck. The collar further includes a tapered component for guiding the collar into the aperture seat.

According to a second embodiment of the invention, the manway system includes a circular manway base and a circular lid for engaging the base and forming a seal with the base. The lid includes a plurality of radially-extending flanges each defining an aperture with an aperture seat and an aperture neck, wherein the aperture seat is substantially round and the aperture neck extends radially outwardly from the aperture seat to an outer edge of the flange, and wherein a width of the aperture neck is less than a width of the aperture seat.

A plurality of bolt assemblies are spaced around a perimeter of the base. Each bolt assembly includes a bolt, a nut, and a safety collar. A first end of the bolt is pivotally secured to the assembly such that the bolt is moveable from a locked position to an unlocked position, wherein when in the locked position the bolt extends through the aperture seat of one of the plurality of flanges. The nut selectively engages the flange when the bolt is in the locked position to maintain the lid in a fixed relationship with the base. The safety collar is threadedly attached to one of the plurality of bolts between the nut and the first end of the bolt such that the collar is within the aperture seat when the bolt is in the locked position. The collar includes a tapered component for guiding the collar into the aperture seat, wherein the collar fits within the aperture seat and presents a width greater than the width of the aperture neck, thereby preventing the collar from passing through the aperture neck.

A third embodiment of the invention is a railcar with an improved manway system. The railcar comprises a storage tank, a circular manway base, and a circular manway lid. The manway base is secured to the tank and defines a passage into the tank, and the lid engages the base and forms a seal with the base thereby closing the passage. The lid includes a plurality of radially-extending flanges each defining an aperture with an aperture seat and an aperture neck, wherein the aperture seat is substantially round and the aperture neck extends radially outwardly from the aperture seat to an outer edge of the flange, and wherein a width of the aperture neck is less than a width of the aperture seat.

A plurality of bolt assemblies are spaced around a perimeter of the base, wherein each assembly includes a bolt, a nut, and a safety collar. A first end of the bolt is secured to the assembly such that the bolt is moveable from a locked position to an unlocked position, wherein when in the locked position the bolt extends through the aperture seat of one of the plurality of flanges. The nut selectively engages the flange when the bolt is in the locked position to maintain the lid in a fixed relationship with the base.

The safety collar is threadedly attached to one of the plurality of bolts between the nut and the first end of the bolt such that the collar is within the aperture seat when the bolt is in the locked position, wherein the safety collar is defined by an annular wall presenting a substantially smooth outer surface, a threaded inner surface, and a tapered upper rim with a beveled surface sloping upwardly from the outer surface to the inner surface at an angle of between about twenty and about seventy degrees. The outer surface of the collar fits within the aperture seat and presents a width greater than the width of the aperture neck, thereby preventing the collar from passing through the aperture neck.

A fourth embodiment of the invention involves a method of sealing a manway system. The method comprises moving a lid toward a base defining a manway opening so that the lid substantially covers the opening, wherein the lid includes an aperture with an aperture seat and an aperture neck, and wherein the neck is narrower than the seat. A bolt coupled to the base is pivoted so that a portion of the bolt passes through the neck and into the seat, wherein the bolt includes a collar disposed between the ends of the bolt; and the lid is further moved toward the base to thereby cause the lid to engage the base, wherein said further moving causes at least a portion of the collar to pass into the seat, wherein the collar includes a tapered rim that facilitates passage of the collar into the aperture seat.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein:

FIG. 1 is a perspective view of an improved safety collar for use with a manway system;

FIG. 2 is a perspective view of an exemplary railcar including a manway system with which the safety collar of FIG. 1 is used;

DETAILED DESCRIPTION OF THE PREFERRED EMBODIMENTS

Figure 3:
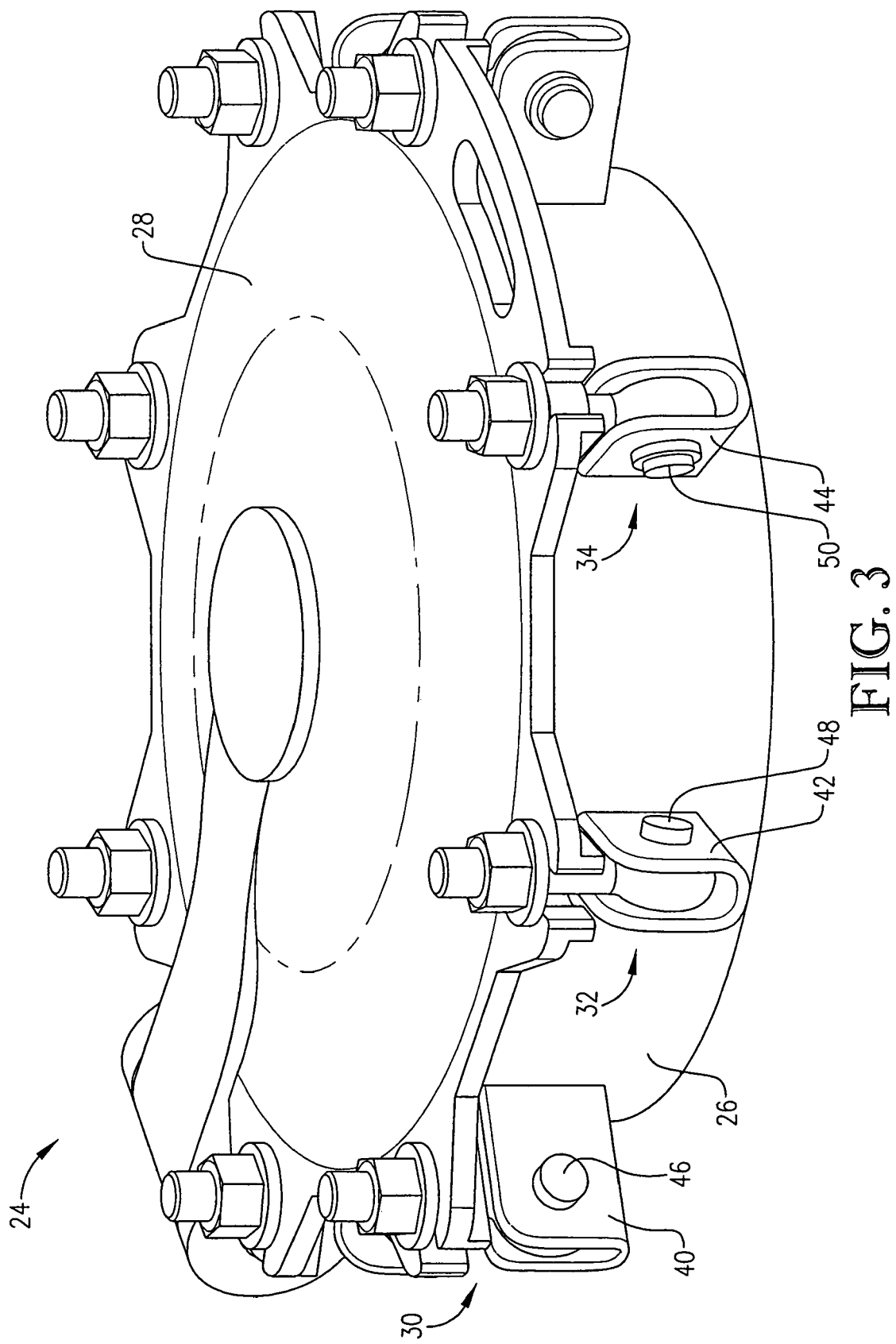
FIG. 3 is a perspective view of the manway system of FIG. 2, shown in greater detail and separate from the railcar.
Figure 4:
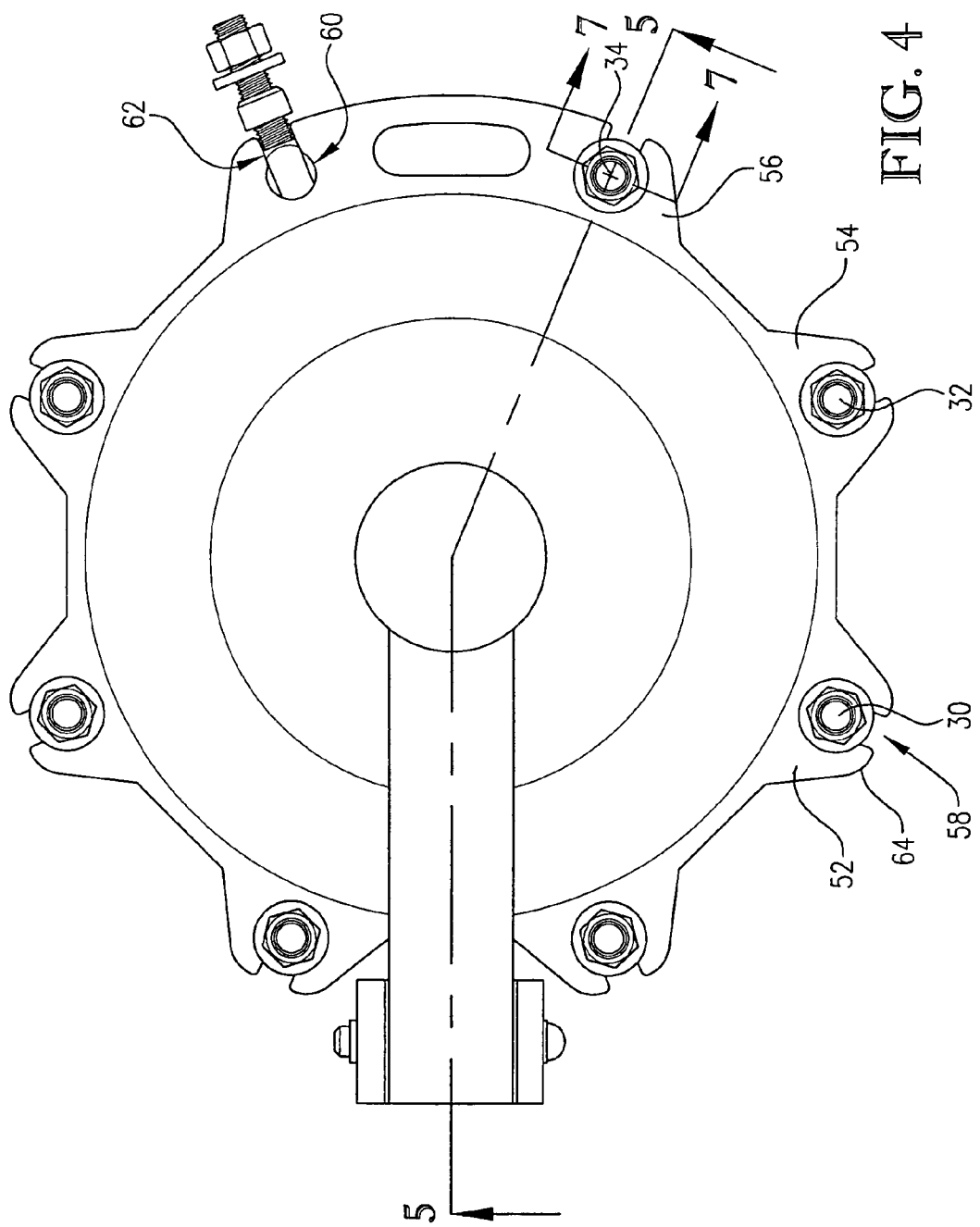
FIG. 4 is a plan view of the manway system of FIG. 3, wherein an eyebolt is shown pivoted away from a manway lid to illustrate the safety collar of FIG. 1 threaded onto the bolt.

An improved manway safety collar built according to principles of the present invention is illustrated in FIG. 1 and designated generally by the reference numeral 10. The collar 10 is generally defined by an annular wall 11 that presents a substantially smooth outer surface 12, a threaded inner surface 14, and a tapered rim 16. The collar 10 is preferably made of steal or other durable, rigid material adapted to withstand the rigors common to a shipping environment.

According to one embodiment of the invention, the outer surface 12 of the collar 10 is approximately two and one-quarter inches in diameter, while the inner surface 14 is threaded to engage a threaded surface of a bolt that is between seven-eighths and one inch in diameter. The inner surface 14 is approximately five-eighths of an inch in height and the outer surface 12 is approximately one-half of an inch in height. The tapered rim 16 presents an annular sloping surface 18 that slopes inward and upward from the outer surface 12 toward the inner surface 14 at an angle of between forty and fifty degrees, wherein the sloping surface 18 is approximately three-sixteenths of an inch wide. The "width" of the sloping surface 18 as recited herein is measured along a line that is parallel to the sloping surface 18.

When the annular sloping surface 18 is herein described as sloping inward and upward at an angle, it means the angle between the sloping surface and a plane that is perpendicular to an axis of the outer surface 12, i.e., the outer surface 12 is normal to the plane.

The annular sloping surface 18 may also be described as presenting a frusto-conical shape in axial alignment with the outer surface 12 of the collar 10, wherein a broader (base) portion of the frustum corresponds to the outer surface 12 of the collar 10 and a narrower (top) portion of the frustum is smaller in diameter than the outer surface 12 and defines an end of the collar 10.

The dimensions of the collar 10 set forth above are provided as an exemplary embodiment of the invention with the understanding that the dimensions may vary without departing from the scope of the claims. For example, the inner surface 14 of the collar 10 corresponds to a size of a bolt on which the collar 10 is threaded and is preferably in the range of from about one-quarter inch to about two inches, more preferably in the range of from about three-fourths of an inch to about one and one-fourth inch; the diameter of the outer surface 12 is preferably in the range of from about one-half inch to three inches, more preferably from about one and one-half inches to about two and one-half inches; the height of the outer surface 12 is preferably in the range of from about one-eighth inch to about eight inches, more preferably from about one-fourth inch to about one-inch; the annular sloping surface 18 preferably present an angle of from about twenty degrees to about seventy degrees, more preferably from about thirty five degrees to about fifty five degrees; the width of the annular sloping surface 18 is preferably in the range of from about one-sixteenth inch to about one-half inch, more preferably from about one-eighth of an inch to about one-fourth of an inch. These ranges are provided as examples only and are not limiting in nature.

An exemplary implementation of the collar 10 is illustrated in FIGS. 2-7. A railcar 20 is shown in FIG. 2, wherein the railcar 20 includes a storage container 22 and a manway system 24, among other things. It will be appreciated that the manway system 24 of the present invention may be used with other containers, such as a container adapted to be pulled by a tractor-trailer. The manway system 24 is shown in greater detail in FIG. 3, wherein the manway system 24 includes a circular base 26 defining a passage to the storage container 22, a circular lid 28 for covering the passage defined by the base 26 and sealing against the base 26; and a plurality of bolt assemblies 30,32,34 for securing the lid 28 against the base 26. As can be seen from FIGS. 3 and 4, the manway system 24 includes eight bolt assemblies, only three of which (30,32,34) are specifically identified and enumerated herein to simplify the present discussion. It will be understood that reference to the bolt assemblies 30,32,34 includes all eight of the assemblies illustrated as part of the manway system 24.

The base 26 is substantially conventional in nature and provides an annular wall 36 (FIGS. 5,6) extending substantially normally from a platform 38 positioned atop the railcar storage container 22. A plurality of brackets 40,42,44 are spaced approximately evenly around a perimeter of the base 26 and extend radially therefrom. Each bracket 40,42,44 includes a pin 46,48,50 that is used for pivotally securing a bolt assembly 30,32,34 to a bracket 40,42,44 by extending through an eye of the bolt assembly 30,32,34. As can be seen from the drawings, the manway system 24 includes eight brackets, only three of which (40,42,44) are specifically identified and enumerated herein to simplify the present discussion. It will be understood that reference to the brackets 40,42,44 includes all eight of the brackets illustrated as part of the manway base 26.

The lid 28 is substantially circular with a series of substantially flat flanges 52,54,56 extending radially outwardly from the lid 28. Each flange includes an aperture, such as aperture 58 of flange 52. The apertures are virtually identically configured, therefore only aperture 58 will be described in detail with the understanding that flanges 54 and 56 contain similar apertures. The aperture 58 receives the bolt assembly 30. The aperture 58 includes an aperture seat 60 and an aperture neck 62, wherein the aperture neck 62 extends radially outwardly from the aperture seat 60 toward an outer edge 64 of the flange 52. The aperture seat 60 is substantially circular with a diameter larger than a width of the neck 62 so that the collar 10 fits within the seat 60 but cannot pass through the neck 62, thereby preventing inadvertent separation of the bolt assembly 30 from the aperture 58.

Figure 5:
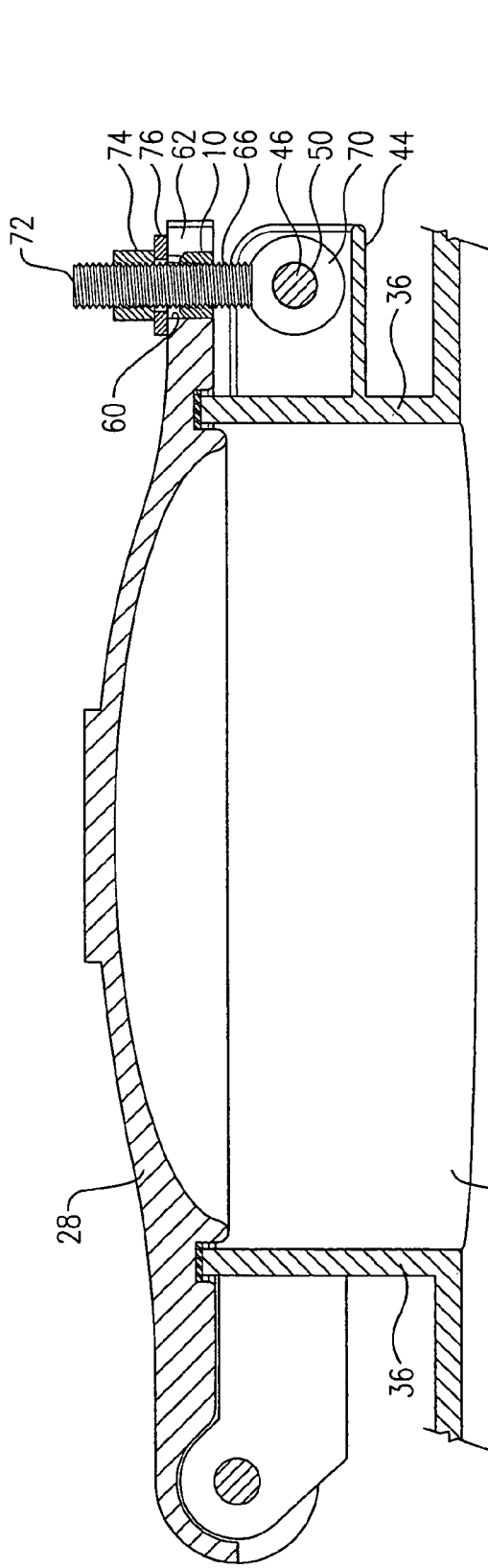
FIG. 5 is a side elevation view of the manway system of FIG. 3, showing a cross-section corresponding to line 5-5 of FIG. 4 and illustrating the bolt and safety collar in a locked position.
Figure 6:
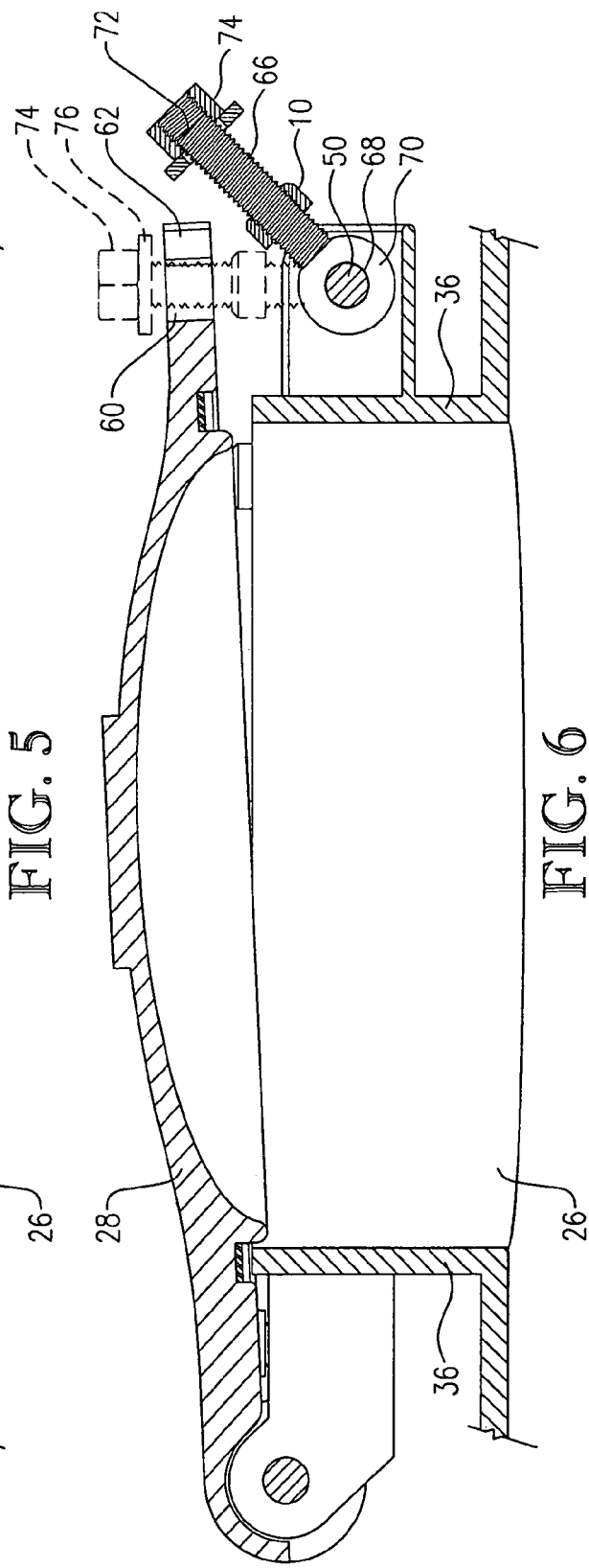
FIG. 6 is a side elevation view of the manway system of FIG. 3, showing a cross-section corresponding to line 5-5 of FIG. 4 and illustrating the bolt and safety collar in an open position.
Figure 7:
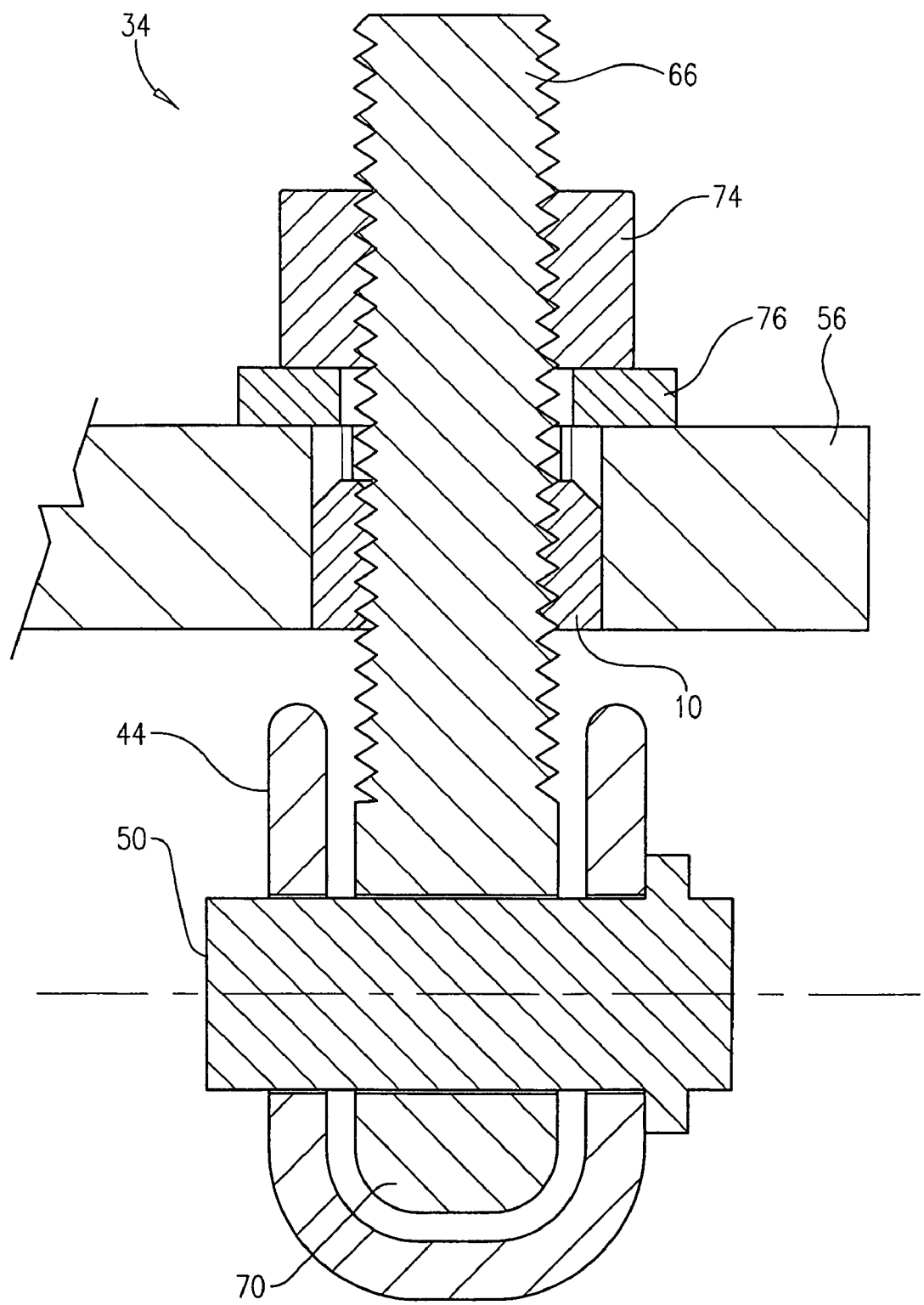
FIG. 7 is a fragmentary view of the manway system of FIG. 3, showing a cross-section corresponding to line 7-7 of FIG. 4.

The bolt assemblies 30,32,34 will now be described in greater detail. The bolt assemblies 30,32,34 are virtually identically configured with the exception of the safety collar 10, as explained below, therefore only bolt assembly 30 will be described in detail with the understanding that bolt assemblies 32 and 34 are similarly constructed. Referring particularly to FIGS. 5-7, the bolt assembly 30 includes an eyebolt 66 with an eye 68 at a first end 70 of the bolt 66 pivotally secured to the pin 46 such that the bolt 66 pivots about the first end 70 wherein a second end 72 pivots away from the lid 28 to an unlocked position (FIG. 6) and pivots toward the lid 28 to a locked position (FIG. 5). As the bolt 66 pivots from the unlocked position to the locked position, a shank of the bolt 66 passes through the aperture neck 62 into the aperture seat 60.

The bolt assembly 30 further includes a nut 74 and a washer 76, both of which are substantially convention. The washer 76 is approximately one-eighth of an inch thick with an outer diameter of approximately two inches and an inner diameter of approximately one inch. The distance between opposing outer sides of the nut is preferably one and seven-sixteenths of an inch. With the bolt 66 in the locked position, the washer 76 rests against the flange 52 of the lid 28, and the nut 74 is tightened against the washer 76 to secure the lid 28 against the base 26. When the nut 74 is loosened, the bolt 66 is allowed to pivot about the pin 46 so that a shank of the bolt 66 passes through the aperture neck 62 and away from the flange 52 to allow the lid 28 to be lifted off of the base 26.

The safety collar 10 is used with at least one of the bolt assemblies 30,32,34, and will be described as being used with the assembly 30 with the understanding that the collar 10 could be used with any of the bolt assemblies 30,32,34 or a collar could be used with each of the assemblies 30,32,34. In use, the collar 10 is threaded onto the bolt 66 so that the end of the collar 10 with the tapered rim 16 is furthest from the eye 68 of the bolt 66. The washer 76 is then slid onto the bolt 66 followed by the nut 74, such that the collar 10 is between the washer 76 and the eye 68 of the bolt 66. A space is left between the collar 10 and the washer 76 sufficiently large to allow the shank of the bolt 66 to pass through the aperture neck 62 into the aperture seat 60 as the bolt 66 is pivoted from the unlocked position (FIG. 6) to the locked position (FIG. 5). With the bolt 66 in the upright or locked position, the lid 28 is lowered so that the aperture seat 60 slides over the collar 10, and the nut 74 is tightened against the washer 76 to secure the lid 28 against the base 26, as illustrated in FIG. 5.

The tapered rim 16 of the collar 10 facilitates engagement of the aperture 58 with the collar 10. As the aperture seat 60 slides over the collar 10 when the lid 28 is pivoted closed, for example, the tapered rim 16 serves to guide the seat 60 into alignment with the collar 10 so that the seat 60 slides around the collar 10. FIG. 6 illustrates the lid 28 in a slightly opened position, while FIG. 5 illustrates the lid 28 in a closed position wherein the seat 60 has slid onto the collar 10. If the aperture seat 60 is not aligned with the collar 10, the seat 60 will contact the annular sloping surface 18 of the rim 16 and the surface 18 will urge the seat 60 toward alignment with the collar 10 as the seat 60 slides downward around the collar 10. It will be appreciated that prior art collars with conventional square edges would not guide the aperture seat 60 into position in this manner, but rather would catch the flange 52 and prevent the lid 28 from closing against the base 26, as explained above in the section entitled "DESCRIPTION OF THE PRIOR ART."

In addition to facilitating engagement of the aperture 58 with the collar 10, the safety collar 10 also prevents the bolt 66 from inadvertently pivoting out of the aperture 58 to an unlocked position. This is important, for example, when the lid is being opened. To open the lid 28, the nut 74 is loosened to relieve pressure exerted on the lid 28 by the nut 74 via the washer 76. If the contents of the storage container 22 are under pressure, the lid 28 will tend upward under the pressure. Under these circumstances, if the bolt 66 were to inadvertently swing to the open position the lid 28 would be forced open, resulting in spilled contents and possibly damage to the railcar 20 and personal injury the user.

Referring to FIG. 6, the safety collar 10 prevents the bolt 66 from pivoting from the locked position to the unlocked position until the aperture seat 60 has disengaged the collar 10. The aperture seat 60 may disengage the collar 10 when, for example, the lid 28 has been raised so that the flange 52 is above the collar 10. A user may loosen the nut 74 sufficiently to allow the lid 28 to unseal from the base 26 and raise slightly, thus relieving any pressure that has built within the storage container 22. When the user determines that it is safe to release the lid 28, he or she loosens the nut 74 sufficiently to allow the flange 52 to raise above the safety collar 10, pivots the bolt 66 out of the aperture (see FIG. 6), and raises the lid 28.

Although the invention has been described with reference to particular embodiments illustrated in the attached drawings, it is noted that equivalents may be employed and substitutions made herein without departing from the scope of the invention as recited in the claims. For example, the tapered rim 16 of the collar 10 may not be a continuous annular component as illustrated, but may be interrupted by one or more breaks, or may be defined by a series of separate tapered components in a circular arrangement near an end of the collar 10 to function substantially as the illustrated tapered rim 16. Furthermore, the annular sloping surface 18 may be substantially flat, as illustrated, or may be convex or concave.

Having thus described the preferred embodiment of the invention, what is claimed as new and desired to be protected by Letters Patent includes the following:

1. A manway system comprising: a base; a lid for engaging the base, the lid defining an aperture having an aperture seat and an aperture neck, wherein the neck is narrower than the seat; a bolt pivotally secured to the base such that the bolt is moveable from a locked position to an unlocked position, wherein a portion of the bolt passes through the aperture neck into the aperture seat when the bolt is moved from the unlocked position to the locked position; and a collar attached to the bolt such that the collar is seatable within the aperture seat when the bolt is in the locked position, wherein the collar includes an outer surface that fits within the aperture seat and presents a width greater than a width of the aperture neck, thereby preventing the collar from passing through the aperture neck, and wherein the collar includes a tapered component for guiding the collar into the aperture seat, wherein the tapered component is a chamfered rim of the collar, wherein the chamfered rim includes an annular sloping surface extending inwardly from the outer surface of the collar, and wherein the collar is defined by an annular wall presenting the outer surface, a threaded inner surface, and a chamfered rim with a tapered surface sloping from the outer surface toward the inner surface.

2. The system as set forth in claim 1, wherein a pivot point is defined by movement of the bolt, and wherein the chamfered rim is located on an end of the collar furthest the pivot point.

3. The system as set forth in claim 1, wherein the annular sloping surface extends inwardly from the outer surface at an angle of between about twenty and about seventy degrees.

4. The system as set forth in claim 1, wherein the annular sloping surface is between about one-sixteenth and about one-half of an inch wide.

5. The system as set forth in claim 1, further comprising a nut for threadedly engaging the bolt and securing the lid against the base.

6. The system as set forth in claim 1, wherein the lid includes a radially-extending flange that defines the aperture.

7. The system as set forth in claim 1, wherein a diameter of the outer surface of the collar is between about one-half inch and about three inches, a height of the outer surface of the collar is between about one-eighth inch and about eight inches, and the inner surface threadedly engages a shank of the bolt, wherein the shank is between about one-quarter inch and about two inches in diameter.

8. The system as set forth in claim 1, wherein the tapered surface slopes upwardly from the outer surface at an angle of between about twenty and about seventy degrees.

9. The system as set forth in claim 1, wherein a pivot point is defined by movement of the bolt, and wherein the tapered surface forms a frusto-conical section with a base of the section corresponding to the outer surface and a top of the section defining an end of the collar furthest the pivot point.

10. A manway system comprising: a circular manway base; a circular lid for engaging the base and forming a seal with the base, the lid including a plurality of radially-extending flanges each defining an aperture with an aperture seat and an aperture neck, wherein the aperture seat is substantially round and the aperture neck extends radially outwardly from the aperture seat to an outer edge of the flange, and wherein a width of the aperture neck is less than a width of the aperture seat; a plurality of bolt assemblies spaced around a perimeter of the base, each assembly including—a bolt with a first end pivotally secured to the assembly such that the bolt is moveable from a locked position to an unlocked position, wherein when in the locked position the bolt extends through the aperture seat of one of the plurality of flanges, and a nut for selectively engaging the flange when the bolt is in the locked position to maintain the lid in a fixed relationship with the base; a safety collar threadedly attached to one of the plurality of bolts between the nut and the first end of the bolt such that the collar is within the aperture seat when the bolt is in the locked position, wherein the collar includes a tapered component for guiding the collar into the aperture seat, wherein the collar fits within the aperture seat and presents a width greater than the width of the aperture neck, thereby preventing the collar from passing through the aperture neck, and wherein the safety collar is defined by an annular wall presenting a substantially smooth outer surface, a threaded inner surface, and a chamfered rim with a tapered surface sloping upwardly from the outer surface toward the inner surface at an angle of between about twenty and about seventy degrees.

11. The manway system as set forth in claim 10, wherein the tapered component includes a chamfered rim of the collar presenting a beveled surface, wherein the rim is on an end of the collar furthest the first end of the bolt.

12. The manway system as set forth in claim 10, wherein the bolt includes a threaded shank with a diameter of between about seven-eighths inch and about one inch.

13. The system as set forth in claim 10, wherein the tapered surface forms a frusto-conical section with a base of the section corresponding to the outer surface and a top of the section defining an end of the collar furthest the first end of the bolt.

14. A railcar with an improved manway system, the railcar comprising: a storage tank; a circular manway base secured to the tank and defining a passage into the tank; a circular lid for engaging the base and forming a seal with the base thereby closing the passage, the lid including a plurality of radially-extending flanges each defining an aperture with an aperture seat and an aperture neck, wherein the aperture seat is substantially round and the aperture neck extends radially outwardly from the aperture seat to an outer edge of the flange, and wherein a width of the aperture neck is less than a width of the aperture seat; a plurality of bolt assemblies spaced around a perimeter of the base, each assembly including—a bolt with a first end pivotally secured to the assembly such that the bolt is moveable from a locked position to an unlocked position, wherein when in the locked position the bolt extends through the aperture seat of one of the plurality of flanges, and a nut for selectively engaging the flange when the bolt is in the locked position to maintain the lid in a fixed relationship with the base; a safety collar threadedly attached to one of the plurality of bolts between the nut and the first end of the bolt such that the collar is within the aperture seat when the bolt is in the locked position, wherein the safety collar is defined by an annular wall presenting a substantially smooth outer surface, a threaded inner surface, and a chamfered upper rim with a tapered surface sloping upwardly from the outer surface to the inner surface at an angle of between about twenty and about seventy degrees, wherein the outer surface of the collar fits within the aperture seat and presents a width greater than the width of the aperture neck, thereby preventing the collar from passing through the aperture neck.

15. The railcar as set forth in claim 14, wherein each bolt includes a threaded shank with a diameter of between about one-half inch and about one and one-half inches.

16. The railcar as set forth in claim 15, wherein the outer surface of the collar is between about two and about two and one-half inches in diameter and is between about one-quarter inch and about one inch in height.

17. A method of sealing a manway system, the method comprising: moving a lid toward a base defining a manway opening so that the lid substantially covers the opening, wherein the lid includes an aperture with an aperture seat and an aperture neck, and wherein the neck is narrower than the seat; pivoting a bolt coupled to the base so that a portion of the bolt passes through the neck and into the seat, wherein the bolt includes a collar disposed between the ends of the bolt; and further moving the lid toward the base to thereby cause the lid to engage the base, wherein said further moving causes at least a portion of the collar to pass into the seat, and wherein the collar includes a tapered rim that facilitates passage of the collar into the aperture seat, wherein the tapered rim is on an end of the collar furthest the pivot point of the bolt, and wherein the collar includes an annular wall presenting a substantially smooth outer surface and a threaded inner surface, wherein the tapered rim includes a sloping annular surface that extends from the outer surface toward the inner surface.

18. The method as set forth in claim 17, wherein the tapered rim contacts the lid proximate the aperture seat during said further moving to thereby align the collar for passage into the aperture seat.

19. The method as set forth in claim 17, further comprising attaching a nut to the bolt and tightening the nut to secure engagement of the lid and the base.

20. The method as set forth in claim 17, further comprising pivoting the bolt into the aperture such that a shank of the bolt passes through the aperture neck into the aperture seat.

21. The method as set forth in claim 17, wherein the tapered rim presents an annular, inwardly-extending sloping surface that is between about one-sixteenth and about one-half of an inch wide.

22. The method as set forth in claim 21, wherein the collar includes an outer surface, and the annular sloping surface extends inwardly from the outer surface at an angle of between about twenty and about seventy degrees.

23. The method as set forth in claim 22, wherein the outer surface is approximately two and one-quarter inches in diameter and approximately five-eighths of an inch in height.

24. The method as set forth in claim 17, wherein the threaded inner surface is sized to be threaded onto a threaded shank of a bolt that is between about seven-eighths and about one inch in diameter.

\* \* \* \* \*